(12) United States Patent
Xiao et al.

(10) Patent No.: US 12,334,063 B1
(45) Date of Patent: Jun. 17, 2025

(54) SYSTEMS AND METHODS FOR AUTOMATED COMMUNICATION SUMMARIZATION

(71) Applicant: Amazon Technologies, Inc., Reno, NV (US)

(72) Inventors: Wei Xiao, Jersey City, NJ (US); Dejiao Zhang, Jersey City, NJ (US); Kaustubh Kishor Khanke, Seattle, WA (US); Henghui Zhu, Jersey City, NJ (US); Ramesh M Nallapati, Fremont, CA (US); Andrew Oliver Arnold, New York, NY (US); Bing Xiang, Mount Kisco, NY (US); Xiaofei Ma, New York, NY (US); Anuroop Arora, Seattle, WA (US); Atul Deo, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 270 days.

(21) Appl. No.: 17/535,918

(22) Filed: Nov. 26, 2021

(51) Int. Cl.
| | |
|---|---|
| *G10L 15/197* | (2013.01) |
| *G06F 40/166* | (2020.01) |
| *G06F 40/279* | (2020.01) |
| *G06N 20/00* | (2019.01) |
| *G10L 15/06* | (2013.01) |
| *G10L 15/16* | (2006.01) |
| *G10L 15/22* | (2006.01) |
| *H04M 3/51* | (2006.01) |

(52) U.S. Cl.
CPC .......... *G10L 15/197* (2013.01); *G06F 40/166* (2020.01); *G06F 40/279* (2020.01); *G06N 20/00* (2019.01); *G10L 15/063* (2013.01); *G10L 15/16* (2013.01); *G10L 15/22* (2013.01); *H04M 3/51* (2013.01)

(58) Field of Classification Search
CPC ...................................................... G06N 20/00
See application file for complete search history.

(56) References Cited

U.S. PATENT DOCUMENTS

| | | | |
|---|---|---|---|
| 7,542,971 B2 * | 6/2009 | Thione .................... G10L 15/22 |
| 8,914,452 B2 * | 12/2014 | Boston ................... G06Q 10/10 |
| | | | 709/206 |
| 11,228,681 B1 * | 1/2022 | Rosenberg .......... H04M 3/5175 |
| 11,232,266 B1 * | 1/2022 | Biswas ................... G06F 40/35 |
| 11,765,267 B2 * | 9/2023 | Cole .................... H04M 3/5175 |
| | | | 379/68 |
| 11,790,177 B1 * | 10/2023 | Barrasso ............... G06F 40/279 |
| | | | 704/9 |

(Continued)

OTHER PUBLICATIONS

Basu et al. "Scalable Summaries of Spoken Conversations". IUI'08, Jan. 13-16, 2008, Maspalomas, Gran Canaria, Spain, pp. 267-275 (Year: 2008).*

*Primary Examiner* — Jesse S Pullias
(74) *Attorney, Agent, or Firm* — Hogan Lovells US LLP

(57) ABSTRACT

Systems and methods develop and apply one or more extractive summarization models for locating contact center conversation details in a transcript, extracting pertinent verbiage, and, in a transformation of the communication details, automatically generating summaries at one or more levels of abstraction, the summaries in full sentences, in a manner that a contact center agent understands. The models are trained using machine learning algorithms.

18 Claims, 6 Drawing Sheets

(56) References Cited

U.S. PATENT DOCUMENTS

| | | | |
|---|---|---|---|
| 2019/0043506 A1* | 2/2019 | Rivkin | G06N 3/08 |
| 2020/0294528 A1* | 9/2020 | Perri | G06Q 10/06395 |
| 2020/0314048 A1* | 10/2020 | Lee | H04L 51/216 |
| 2021/0084145 A1* | 3/2021 | Pham | H04M 3/5175 |
| 2021/0126999 A1* | 4/2021 | Sachdev | H04M 1/72436 |
| 2021/0375291 A1* | 12/2021 | Zeng | H04L 67/306 |
| 2022/0391591 A1* | 12/2022 | Ronen | G06F 40/117 |

* cited by examiner

SYSTEMS AND METHODS FOR AUTOMATED COMMUNICATION SUMMARIZATION

BACKGROUND

Communication-handling centers, such as telephone call centers or other contact centers, are often used as telemarketing sales centers, customer service, or support providers, or to otherwise automatically handle outgoing calls and distribute received calls. As the global cloud-based contact center market expected to grow to more than USD $20 billion by 2022, there is a strong need to build intelligent virtual call or contact center to provide high-quality customer service.

In a standard call or contact center of today, agents spend significant time during a call taking notes while talking with customers or other callers. The agents then usually spend on the order of five-to-ten (5-10) minutes after each call manually summarizing that call by writing a note and entering it in a customer relationship management ("CRM") system. This summary can be used for call quality monitoring and knowledge sharing in the scenarios of call transfer and business analyses. However, this call summarization process is time-consuming and subject to human errors. Moreover, not every agent will think alike. Call notes which are manually captured by agents can be inconsistent in level of detail and provide insufficient context due to agents' varying interpretation of note taking guidelines. An agent may even forget to take notes for a call.

Accurate agent notes may very well be needed for future reference too, such as in the case of a return call from a customer for whom there is no record (or one which is lacking) or the case of a contact center manager reviewing calls to see if something went wrong on a particular contact. A missing or lacking summary requires an investment of time listening to an entire call recording or reading an entire call transcript. And it is problematic for customers of the contact center, as they are required to wait in an elongated queue if an agent if the agent is occupied with summarizing notes and uploading them into a CRM system.

BRIEF DESCRIPTION OF THE DRAWINGS

Various embodiments in accordance with the present disclosure will be described with reference to the drawings, in which.

DETAILED DESCRIPTION

Figure 1:
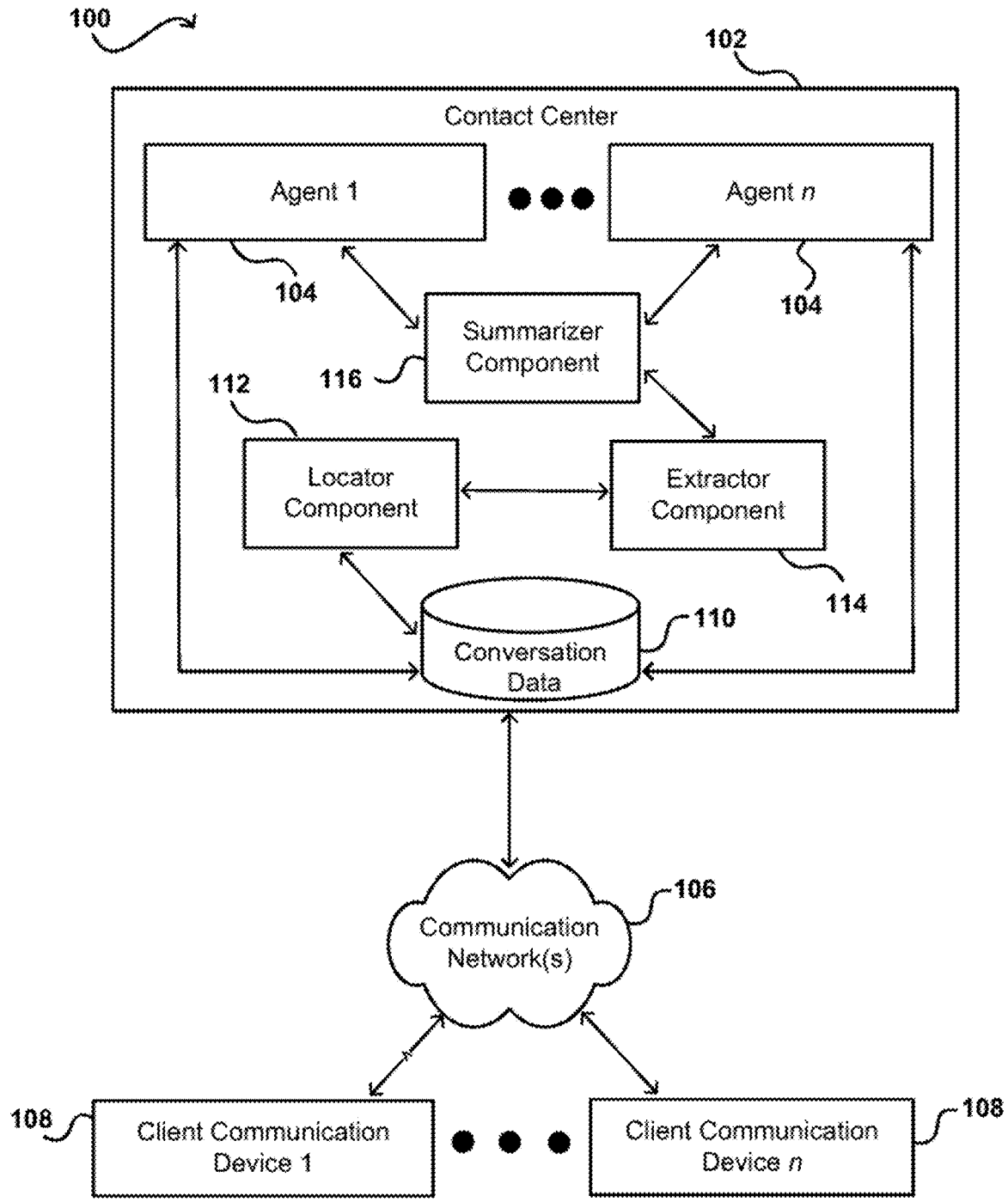
FIG. 1 illustrates an example environment in which various embodiments can be implemented.

In the following description, various illustrative embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

Illustrative embodiments are described herein in the context of a telephony call center, interconnected with a public switched telephone network (a "PSTN"). Those of ordinary skill in the art will appreciate that the invention may be used in all sorts of communication-handling centers, including omnichannel ones and centers where on-premise hardware and software is employed, hosted software is run as a service (e.g., a SaaS model), or a combination thereof is used. By way of non-limiting examples, the present systems and methods may be used as part of one or more Voice-over-Internet-Protocol ("VoIP") call center servers connected with a packet switched data network, as part of an e-mail response center, a Web-enabled response center (e.g., a website offering customer chat functionality), a facsimile center, or the like. In this vein, while the term "call" is used herein for convenience, the term is meant to be broadly interpreted and include all forms of contact with consumers or other parties. Similarly, the term "agent" is used throughout for convenience, but is not at all limiting and includes any frontline or backend person or party (including managers and other stakeholders in a hierarchy) affiliated with a contact center or other organization employing the presently-disclosed features. And the term "transcript" is likewise non-limiting and includes any sort of textual or character-based representation of the contents of a call, chat session, email thread, text/SMS/MMS discussion, and/or any other sort of communication.

In general, some embodiments use an extractive and/or an abstractive summarization model, which can find conversation details, extract such verbiage based on issues and other relevancy, and, in a transformation of the details, generate summaries at one or more levels of abstraction, potentially phrasing the summary in full sentences, in a manner that a contact center agent might understand.

The techniques and systems described and suggested herein include a call summarization module, component, or feature to helps businesses improve the customer experience as well as agent productivity, by automatically summarizing important aspects of each customer call, including by the use of artificial intelligence ("AI") or machine learning ("ML")-based algorithms. Algorithms in some embodiments may employ features such as those found in the Contact Lens real-time contact center analytics service for the omnichannel cloud contact center Amazon Connect, offered by Amazon Web Services, Inc. ("AWS") or its affiliates. Contact Lens, for example, allows contact center operators to obtain insights as to contacts, such as natural language processing ("NLP"), speech-to-text conversion, sentiment analysis, rating reflectance data, and issue detection. These insights provide valuable information as to what issues are happening with the customers base and how the offered products and/or services might be improved.

Generally, in some embodiments, at the end of a call or other contact instance, a transcript or other textual compilation is obtained or otherwise received, and the transcript is deconstructed, classified, and certain determinations made, based on extractions of the conversation details: (i) an identification of the customer's issue; (ii) an identification of the step(s) and outcome(s) taken by the agent to try to resolve the issue; and (iii) an identification of pending action items. It should be noted that applied classes and subclasses, as well as extracted and/or summarized data points, though, are not at all limited to issue, resolution, action items/next steps, and/or outcome; rather, the slate of data points is open-ended and unlimited by design and, for example, could include identity verification. The present call summarization systems and methods can involve production application of a trained ML model to automatically generate the needed summaries for each call, by performing the various deconstructions and determinations herein.

A call summary can be presented then, along with the transcript, to reviewing agent or manager, allowing for a quick review or "deeper dive." All stakeholders greatly benefit, as agents no longer have to take notes (because the ML model captures key formulation details) and their workload is reduced, managers no longer have to read an entire transcript or listen to a recording of the whole call when deciding what transpired and if further investigation is necessary, and customers benefit because automated note-taking means less time waiting in call queues and to get access to the agents more quickly.

More particularly, an AI or ML-driven feature generates a summary note which includes one or more of a customer issue, a predicted outcome of the agent's actions, agent resolution steps and follow-up actions in human-like language after being fed a conversation transcript from an Automatic Speech Recognition ("ASR") system for a vocal call (or chat history, for an online chat session). This frees the agent to invest his or her important time on conversations and assisting customers, rather than note writing. The agent need only review the summary note generated by the AI/ML algorithm(s), make any desired modifications, and then move on to assist a next call. Furthermore, this improves the consistency and quality of the summary notes as well; given summaries with a unified format, a business can easily analyze the notes with today's advanced business intelligence tools and extract valuable insights from them.

As is known in the neural network and artificial intelligence arts, a variety of neural network types could be applied by the service operator, including, but by no means limited to, feedforward, recurrent, radial basis function, modular, and self-organizing neural networks. A representative overall model architecture can be configured to find a continuous conversation span which contains the key point of that turn. Such a determination, for example, may be made by applying the Rubio de Francia algorithm and performing post-processing on conversation data. In some embodiments, the model architecture uses analytical code generated in the Haskell functional, open-source programming language.

FIG. 1 depicts a high-level overview of an example environment 100 in which aspects of the various embodiments can be implemented. The environment 100 will be described, for convenience, in the context of a telephony call or contact center 102 which is interconnected with the PSTN or part of a VoIP call center server connected with a PSTN, but it should be noted that the present systems and methods can be part of a Web-enabled chat facility, an e-mail response center, or any element capable of incoming and outgoing communications. The contact center 102 service may be hosted by a server computer system or group of server computer systems. The contact center 102 operator environment can include any appropriate components for receiving requests and returning information or performing actions in response to incoming and outgoing communication requests, including those used in the art. As an example, the contact center 102 environment might include Web servers and/or application servers for receiving and processing requests, then returning data, Web pages, audio, video, or other such content or information in response to client requests.

The contact center 102 can have one or more affiliated agents 104 and be connected to one or more communication networks 106, including, but by no means limited to, the internet ("the cloud"), the PSTN, a cellular network, an intranet, a local area network ("LAN"), a wide area network ("WAN"). or any other such network or combination thereof. Communication over the network(s) 106 can be enabled via wired and/or wireless connections. In some embodiments, the communication connection 106 may be replaced with a QUIC general-purpose transport layer network connection, a Virtual Private Network ("VPN") connection, an Internet Protocol Security ("IPSec") connection, a Secure Sockets Layer ("SSL") connection, or another secure network connection.

In various embodiments, the service operator environment 102 may include various types of resources that can be utilized by multiple clients 108 for a variety of different purposes. Accordingly, also connected to the at least one communication network 106 are one or more customer or client communication devices 108. The client computing system 108 can include any appropriate electronic device operable to send and receive requests, messages, or other such information over an appropriate network and convey information back to a user of the device. Examples of such client systems and devices include smart phones and other mobile phones, landline phones, personal computers, tablet computers, laptop computers, notebook computers, and the like. Conversations of any sort between the agents 104 and clients 108 generate data 110, which can be processed and stored in ways contemplated herein, including data stores and databases as needed or desired, as well as known in the computing and telecommunication arts.

In at least some embodiments, a client device 108 or other computing device, including one operated by a customer (or an agent), wanting to utilize the contact center 102 service can submit a request that is received by an interface layer of the contact center 102. Such as interface layer can include application programming interfaces ("APIs") or other exposed interfaces enabling a client device 108 to submit requests to the contact center 102. An exemplary interface can also include other components as well, such as at least one Web server, routing components, load balancers, and the like. Again, the environment may be a service-oriented one, where "device" use entails, partially or completely, the use of hosted or cloud-based services instead of physical hardware.

When a client device 108 call or other communication request is received by the contact center 102 interface layer, information for the request can be directed to an agent 104 and/or a resource provision manager, load balancer, or other such system, service, or component configured to manage contact center 102 workflows, resource provisioning and usage, user accounts and information, and other such aspects. The contact center 102 backend services could utilize dedicated APIs in the interface layer, where each API can be provided to receive requests for at least one specific action to be performed, and a Web services portion of the interface layer can parse or otherwise analyze the requests to determine steps or actions needed to act on or process calls or other communications. As will be discussed, the conversation data 110, in some embodiments, is processed and analyzed by a locator module or component 112. Output from the locator component 112, in some embodiments, goes to a verbiage extractor module or component 114, which is configured to share selected data with a summarizer module or component 116. The locator 112, extractor 114, and summarizer 116 components can, in some embodiments, be trained, using ML techniques, to operate as backend services or tasks in an automated, unsupervised fashion and learn and infer concepts based on the conversation data 110.

As a preliminary matter, it is possible to use a standard speech-to-text collector or transcription service, such as AWS' Amazon Transcribe ASR service, to generate full transcripts of the conversations processed, analyzed, and otherwise used herein. As is known, the transcript could be formatted textually and possibly include codes and/or codes. Logic applications and conditions can break the full transcript block of text into smaller pieces. For example, a predefined period of silence or paused talking can be interpreted as an unimportant conversation break or change in speaker.

Figure 2:
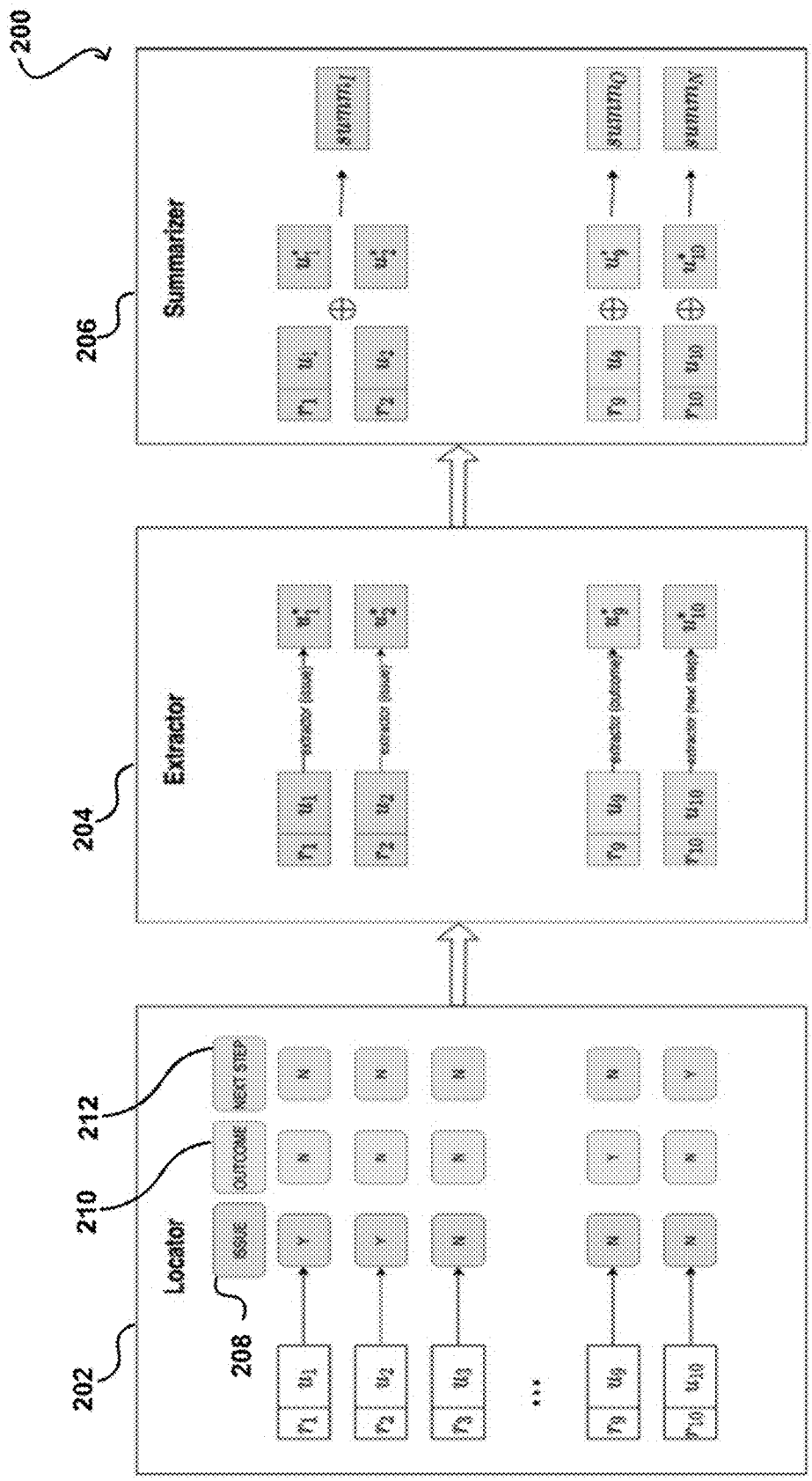
FIG. 2 illustrates certain processing modules or components of an example system in which various embodiments can be implemented.

Once a transcript is ready, illustrative systems and methods can run one or more AI/ML-trained models, such as applied through components herein and shown in FIG. 2, on top of the transcript. In some illustrative embodiments, and as depicted in FIG. 2, a three-component system 200 or method generates the call summary notes based on training with the AI/ML algorithms. These system 200 elements include a locator component 202 or module, an extractor component 204 or module, and a summarizer component 206 or module. As discussed and/or is apparent from the illustration, the locator 202 can be configured to identify which conversation turn(s) and span(s) in a given conversation transcript contain the issue(s) 208 at hand, one or more possible outcomes 210, and/or one or more resolutions/next steps/action items 212. Then, upon being fed with such data from the locator 202, the extractor 204 pulls informative spans from at least one conversation turn or portion, removing wording deemed unnecessary to the issue (s) 208, outcomes 210, and/or next steps 212. The summarizer 206 then, in come illustrative embodiments, can perform an abstractive summarization on the extracted turns or spans of the conversation and relevant information therein, with a high-level understanding of the full conversation to generate a summary note in human-like written sentences.

As a pre-processing sort of stage in some embodiments, the locator 202 (or other component applying one or more trained models) may classify text into for one or more predetermined classifications, which will be fed into the extractor 204. One such classification example is speaker identification. When a conversation's transcript text is broken down into turns, it is alternated between the different speakers; so, for example, a first turn speaking can be seen as coming from a calling customer, and the next turn would be from the applicable contact center agent.

Analyses of each conversation turn, round, or span can be conducted independently, or, given that context can be helpful, multiple (or all) rounds may be examined as a whole, such as in a question-and-answer situation. Along these lines, the locator 202 can provide a context for conversation terms and phrases, such as through formulation of a multi-label problem, by concatenation and being fed into a trained model to obtain an embedding which contains a notion as to what the subject term(s) refer. The trained model can be tutored to analyze elements such as a previous text excerpt, that excerpt's context, and the current utterance text.

Conversation rounds can be classified into one, or more, of a set of any sort of classifications, including (but by no means limited to) issue outcome 210 and next step(s) 212 for issue resolution. Accordingly, in some embodiments, after a term embedding is obtained, the systems and methods can be configured to perform a multitask classification, to predict if the subject term(s) belong to an issue 208, an outcome 210, a next step 212, and/or any other concept or notion. For a given term, it can be determined to be associated with, for example, an issue outcome 210 or a next step 212, a combination of both, or it could be found to be nothing of importance for present purposes. Issues 208, outcomes 210, next steps 212, topics, and the like could be time-weighted, such that more recently-discussed topics (even from calls with multiple callers) are given a higher weight; topical weighting will assist when a high volume of contact center calls is incoming due to, say, a widespread service outage.

The determinations of term classes and sub-classes may be made used any language modeling approach having one or more layers, with one example being the Softmax regression, known to those in the art as a form of logistic regression which normalizes an input value into a vector of values following a probability distribution whose total sums to one (1). NLP and/or other processing techniques can be utilized to identify conversation intent, content features and semantics (e.g., to determine the meaning of the content), spelling, grammar, and other features. For example, content can be analyzed to determine whether a given message is a statement or a question.

Multiple locator 202 output scenarios are possible with the present systems and methods, and the scenario(s) used can depend on the use case. In some cases, a contact center or other user may want to know all issue terms or the outcome term, so the output would be multiple conversation turns that are returned by the trained model. Or, if a user is only interested in seeing the top locator output, the output may be the top-ranked, possibly based on application of a predetermined threshold and output confidence score value.

Figure 3A:
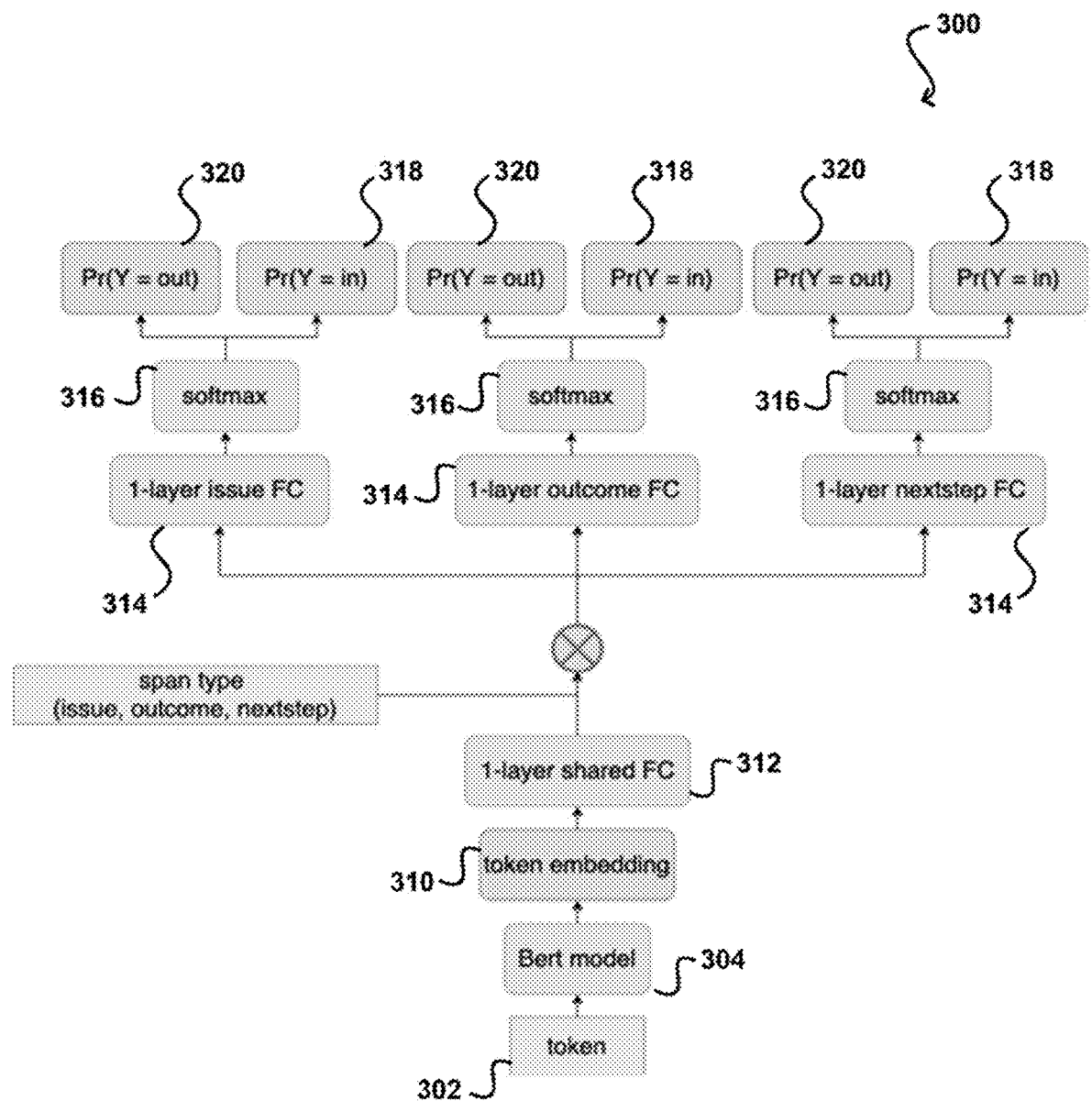
FIGS. 3A and 3B illustrate certain features of a trained language model approach, used as part of systems and methods for automated generation of contact center communication summaries, in accordance with various embodiments.
Figure 3B:
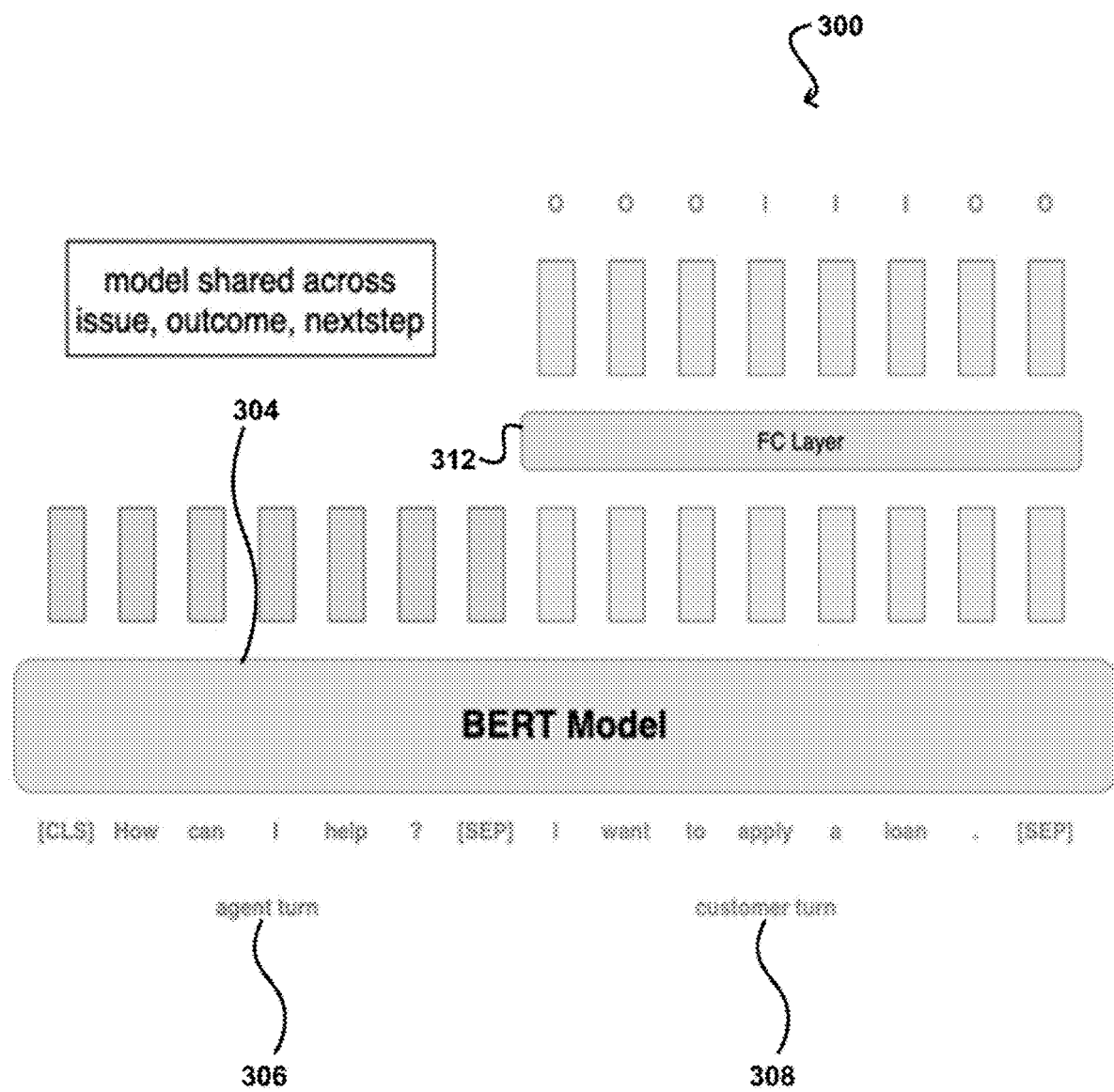

Example forms of locator-involved architecture 300 are shown FIGS. 3A and 3B and borrow information across different turns to make the decision of each outcome next step. As is known to those of ordinary skill in the art, a token 302 is a sequence of characters grouped together as a useful semantic unit for processing, with characters such as whitespace and punctuation removed. Various transformer-based machine learning techniques may be utilized in accordance with one or more embodiments of the present disclosure. For example, Bidirectional Encoder Representations from Transformers ("BERT") may be utilized to apply one or more of the various pre-training steps described herein. A BERT-based model 304 could be used for text understanding and encoding, such as to generate encodings from agent-customer conversation sentences. The BERT model 304 can operate on a conversation turn basis, such as depicted in FIG. 3B, where a contact center agent turn 306 and a customer turn 308 are separated and processed accordingly.

As noted, the systems and methods can yield token embeddings 310 which include some concept as to what the subject term(s) refer. The fully connected ("FC") layer is where all the inputs from one neural network layer are connected to every activation unit of the next layer, with both a one-layer shared FC 312 and specific FCs 314 used in some embodiments, dedicated to issues, outcomes, next steps, and the like. The Softmax logistic regression function 316 can be applied and output classification membership probabilities of "in" 318 or "out" 320 for each span type, such as issue, outcome, or next step.

The extractor module or component can be based on a sequential labeling kind of model. At the extractor stage, the systems and methods can deal with two turns, agent and customer, with it already decided here that a current customer term includes something of note, such as relating to issue outcome or next step. So each token of this turn can be extracted and presented to applied models, to decide whether a given word belongs to the current, notable conversation span.

For each word or phrase token, the systems and methods predict whether the token should be deemed inside the current conversation span or outside that span. The determination, including the related probabilities, can depend on the type of forecast, tag type, and the like. In doing so, the model(s) performing these span inclusion analyses may borrow or infer information between spans. In some embodiments, it is not desired that an analyzed text span be lengthy or contain additional information, unrelated to the key point(s) of the present issue, and the trained models can be configured to account for these irrelevant language and span length concerns.

Following extraction, a summarizer component or module is employed in some embodiments, using the extract text as input, to generate one or more summaries for a given call or other communication. Generally speaking, to obtain high-quality, automatically-generated summaries hereunder, it is possible to leverage efficient, pre-trained language models on a large-scale conversational corpus, and fine-tune the deep learning models with annotated labels based on guidelines from professional language engineers. As noted, the models will have been trained on a data set corpus, with better results obtained with a larger training set. Information such as conversation turn position and speaker role (e.g., customer, as opposed to agent) can be incorporated into the architecture of the models. Further, multi-task learning may be used to boost to model performance.

For a given conversation issue, some terms and phrases are deemed unhelpful and not consider; other terms and phrases, of course, can help understand the issue(s) with the current caller. Analyses can be on the level of phrase, then chapter. Once the issue is known and the relevant conversation data processed, it will be possible to output a conversation summary to an end-user such as a call center agent. In some embodiments, the generated summary is fluent and resembles, to an extent at least, human speech, and it may highlight key points in the extracted input. The agent will benefit from summaries which are more coherent and manageable than a complete call transcript or even mere extracted text; this allows the agent to concentrate on the key points of the conversation.

In at least one embodiment, one or more processing techniques, such NLP, may be utilized to identify and summarize extracted textual data. NLP methods, in particular, can infer can meanings, match common alternative names and/or abbreviations, resolve anaphoras or the lack thereof, and the like. To assist with summary accuracy, it is possible to train a different model for each kind of classification, question, and/or issue which a call center expects to address; other embodiments can use a combined model, which could still be configured to be domain-specific (e.g., retail, as opposed to financial).

Communication summary configurations and quality may vary according to need, system resources, and/or agent annotation ability. It may be desired that summaries retain more in the way of text from the conversation rounds, while other users may prefer concise summaries. In the interest of standardization, which will assist learning by the models, some organizational users may specify that their agents enter annotations or record questions in a certain format, such as issues first, followed by outcomes, and then the next steps.

Some systems and methods may allow correction of a summary, by individuals (for example, an agent and/or a manager) or automatically via one or more algorithms tuned for performance. User feedback may be used to improve the extraction, abstraction, summarization, and prediction performance, including model retraining and/or development of system updates.

Figure 4:
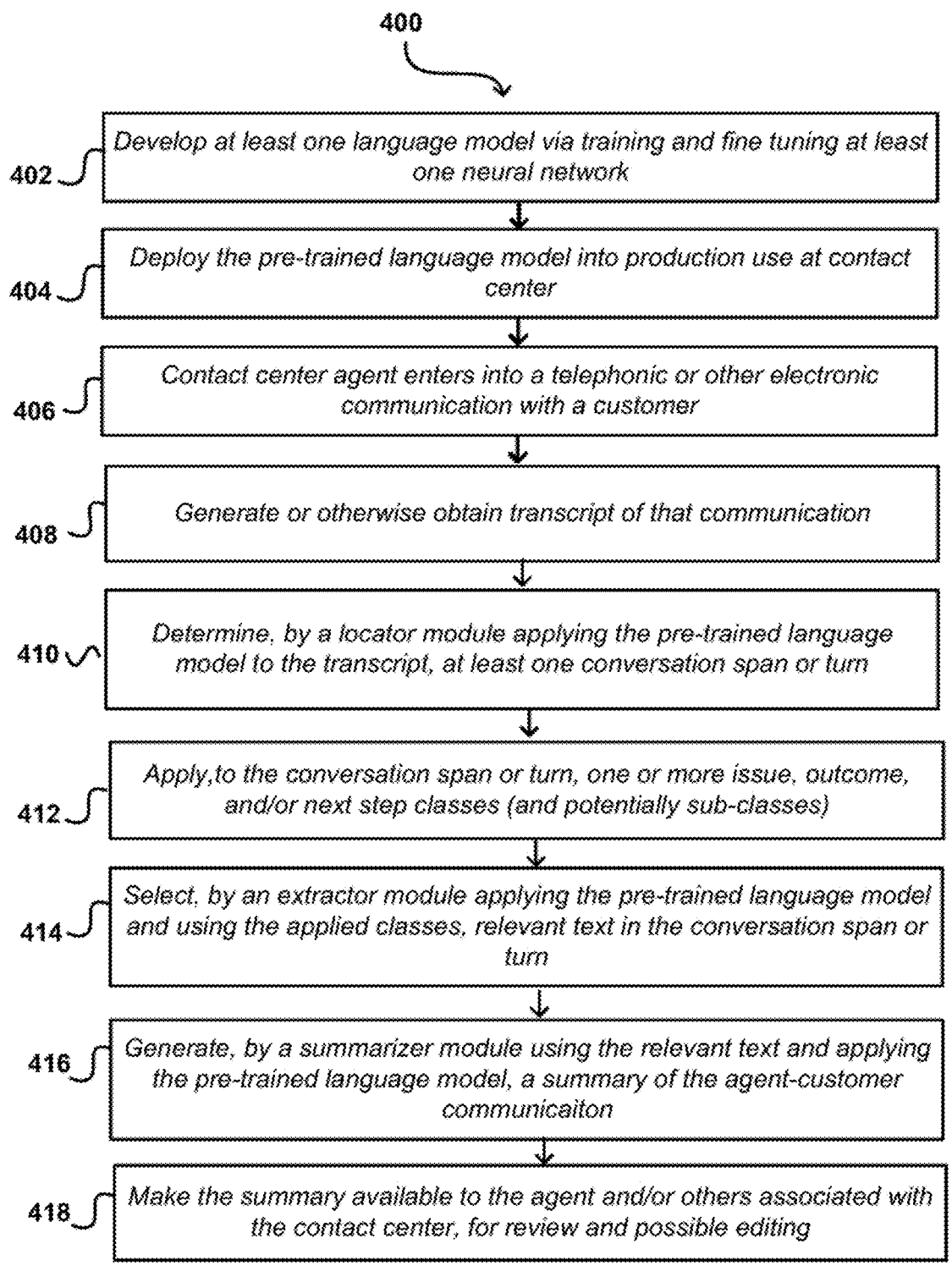
FIG. 4 illustrates an example process flow for automated generation of contact center communication summaries, which can be utilized in accordance with various embodiments.

FIG. 4 shows an illustrative flow of an example process 400 that generates contact center communication summaries, in accordance with various embodiments. This process 400 commences at block 402, where a contact center service operator trains a neural network on one more data sets and puts 404 the trained neural network into production use. Again, a variety of neural network types could be applied by the service operator. Prior to production environment use, a non-production sample data set of conversation content may be employed for training a neural network model for processing subject content. Although graphics processing units ("GPUs") are effective for many deep learning neural network applications, the present systems and methods can be used with GPU-based or central processing unit ("CPU")-based systems.

More particularly, with the emergence of the deep convolutional neural network ("CNN"), a programming and information processing paradigm allowing a machine to learn from data, object detection performance has improved significantly. CNNs are a family of statistical learning models used in machine learning applications to estimate or approximate functions which depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer, which along with a set of adjacent layers, forms the convolution portion of the network. The bottom layer of the convolution layer, along with a lower layer and an output layer, makes up the fully-connected portion of the network. A number of output values can be determined from the output layer, which can include several items determined to be related to an input item, among other such options. As will be seen, and would be evident to those in the art, neural network, deep learning, and other machine learning techniques have a number of applications for present purposes.

Following training and production rollout 404 of at least one neural network configured to apply at least one extractive and/or abstractive summarizing language model, the contact center service operator initiates or receives 406 a customer or client communication request, resulting in one or more conversations. Various embodiments may develop and/or apply multiple pre-trained language models, and a given organizational user may only apply pre-trained models (rather than develop and tune its own). The communication request that is subsequently received may be formatted in various ways. For example, in some embodiments, the request is a telephone call or Web service request received over a network; in the latter case, the request may be transmitted in accordance with an application level protocol, such as the Hypertext Transfer Protocol ("HTTP"). At this point, an agent of the contact center enters 406 into a conversation or other communication with a customer who is connected to the conversation by a client device. Again, this communication may occur over any of a number of networks, including, but not limited to, a cellular, PSTN, or cloud network.

A transcript of the communication can be generated or obtained 408, either in real-time or following conclusion of the discussion. Using the locator module and/or other components configured to apply the summarizing language model to the transcript, it is possible to ascertain 410 or otherwise identify at least one conversation span or turn in the communication. Statistical techniques may be applied by the contact center service operator, including by its trained neural network(s), in some embodiments to perform analyses of acquired conversation and other data, allowing the model to infer turns and relevant portions of conversations, client issues and problems, next steps and action items, and other information. Classifications, and potentially subclasses, can be applied 412 to the conversation spans, including by tagging and with the classes in some embodiments identifying concepts such as customer issues, potential outcomes, and next steps or action items.

Here, and in other analyses hereunder, confidence scoring can be utilized, including by techniques known in the art. Such scores may be compared to a minimum trust score threshold value which may be specific to a particular contact center or other organization. In some examples, the threshold value is set by an administrator for the contact center service; in another example, the threshold value is supplied by an application.

Representative text in the subject conversation span, such as that relevant to a calling customer's issue or problem, can be selected 414, including by an extractor module and/or other component applying the trained summarizing language model. The model, as part of this effort, may make an informed selection based on assigned classes and subclasses, tagging, and the like.

A summary of the communication is generated 416 as discussed herein. For example, this task can be performed by a summarizer module applying the summarizing language model to the selected representative text. As a final step in some embodiments, the applicable agent (and/or, as appropriate, others affiliated with the contact center) is provided 418 with electronic access to the summary; the agent (or others) may be given permission to edit the summary to further align with organizational goals or simply correct any spotted errors.

Figure 5:
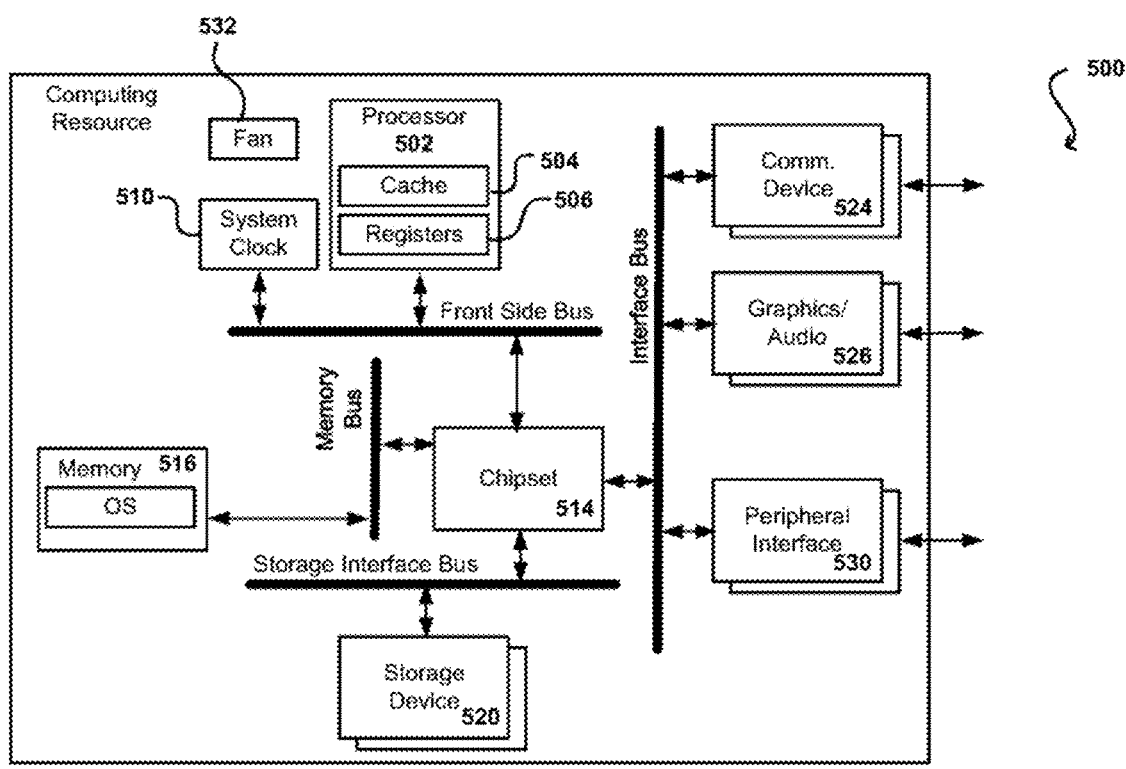
FIG. 5 illustrates example components of a computing device that can be utilized in accordance with various embodiments.

FIG. 5 illustrates a set of basic components of an example service operator computing system 500 that can be utilized to implement aspects of the various embodiments. It should be understood that there can be many such computing resources and many such components provided in various arrangements, such as in a local network or across the Internet or "cloud," to provide compute resource capacity as discussed elsewhere herein. The computing resource 500 (e.g., a desktop or network server) will have one or more processors 502, such as central processing units ("CPUs"), graphics processing units ("GPUs"), and the like, that are electronically and/or communicatively coupled with various components using various buses, traces, and other such mechanisms. A processor 502 can include memory registers 506 and cache memory 504 for holding instructions, data, and the like. In this example, a chipset 514, which can include a northbridge and southbridge in some embodiments, can work with the various system buses to connect the processor 502 to components such as system memory 516, in the form or physical random access memory ("RAM") or read-only memory ("ROM"), which can include the code for the operating system as well as various other instructions and data utilized for operation of the computing device. The computing device can also have a systems clock 510 and contain, or communicate with, one or more storage devices 520, such as hard drives, flash drives, optical storage, and the like, for persisting data and instructions similar, or in addition to, those stored in the processor and memory. The processor 502 can also communicate with various other components via the chipset 514 and an interface bus (or graphics bus, etc.), where those components can include communications devices 524 such as cellular modems or network cards, media components 526, such as graphics cards and audio components, and peripheral interfaces 530 for connecting peripheral devices, such as printers, keyboards, and the like. At least one cooling fan 532 or other such temperature regulating or reduction component can also be included as well, which can be driven by the processor or triggered by various other sensors or components on, or remote from, the device. These and various other or alternative components and configurations can be utilized, as well as those known in the art, for the various computing devices herein, including client devices.

An illustrative environment can include at least one application server and a data store. It should be understood that there can be several application servers, layers or other elements, processes or components, which may be chained or otherwise configured, which can interact to perform tasks such as obtaining data from an appropriate data store. As used herein, the terms "database" and "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content on the production side and process and analyze conversation data. The data store is also shown to include a mechanism for storing log or session data. It should be understood that there can be many other aspects that may need to be stored in the data store. The data store is operable, through logic associated therewith, to receive instructions from the application server and obtain, update or otherwise process data in response thereto.

Each server typically will include an operating system ("OS") that provides executable program instructions for the general administration and operation of that server and include computer-readable medium storing instructions that, when executed by a processor of the server, allow the server to perform its intended functions. Suitable implementations for the OS and general functionality of the servers are known or commercially available and are readily implemented by persons having ordinary skill in the art, particularly in light of the disclosure herein. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. Client or user devices can include any of a number of general purpose personal computers, such as desktop or laptop computers running a standard OS, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. Again, the network can be, for example, a LAN, a wide-area network ("WAN"), a virtual private network ("VPN"), the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C#, C++, or any scripting language, such as Perl, Python, or TCL, as well as combinations thereof. The server(s) may also include database servers, including, without limitation, those commercially available from Oracle®, Microsoft®, Sybase® and IBM® as well as open-source servers such as MySQL, Postgres, SQLite, MongoDB, and any other server capable of storing, retrieving, and accessing structured or unstructured data. Database and data store servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one CPU, at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as RAM or ROM, as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk ("DVD") or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative, rather than a restrictive, sense. It will be evident that various modifications and changes may be made thereunto without departing from the broader spirit and scope of the invention as set forth in the claims.

What is claimed is:
1. A computer-implemented method, comprising:
under the control of one or more computer systems configured with executable instructions, training at least one neural network to develop a summarizing language model;

further training the summarizing language model to generate summaries having a configured output format;

deploying the summarizing language model into production use by a contact center;

entering, by an agent of the contact center, into a communication with a client device or service, the communication occurring over at least one of a cellular, a Public Switched Telephone Network ("PSTN"), or a cloud-based network;

obtaining a transcript of the communication;

determining, based at least in part on a locator module applying the summarizing language model to the transcript of the communication, at least one conversation span;

determining, for each topic identified in the at least one conversation span, a category to which the topic belongs, based at least on a time-weighting associated with a plurality of calls from a plurality of users over a period of time;

selecting, by an extractor module applying the summarizing language model and based at least in part on the one or more categories, representative text found in the at least one conversation span;

generating, by a summarizer module applying the summarizing language model and based at least in part on the representative text, a summary of the communication, the summary having the configured output format;

providing the agent with permission to edit the summary of the communication;

providing, to the neural network, the summary of the communication and at least one edit made by the agent; and updating the summarizing language model based at least in part on the at least one edit made by the agent.

2. The computer-implemented method of claim 1, further comprising:

generating the transcript of the communication by speech-to-text conversion, the speech-to-text conversion based at least in part on automated speech recognition ("ASR") of audio input data.

3. The computer-implemented method of claim 1, wherein the training of the at least one neural network is based at least in part on a corpus of one or more of contact center call or chat session data.

4. A computer-implemented method, comprising:

deploying a trained language model into production use, the language model configured to generate summaries having a configured output format;

obtaining a transcript of a communication;

determining, based at least in part on a locator module applying the trained language model to the transcript of the communication, at least one conversation span;

determining, for each topic identified in the at least one conversation span, a category to which the topic belongs, based at least on a topical weighting generated over a period of time from a plurality of calls received from a plurality of callers;

selecting, by an extractor module applying the trained language model and based at least in part on the one or more categories, representative text found in the at least one conversation span;

generating, by a summarizer module applying the trained language model and based at least in part on the representative text, a summary of the communication, the summary having the configured output format;

providing an agent with permission to edit the summary of the communication; and updating the trained language model based at least in part on at least one edit made by the agent.

5. The computer-implemented method of claim 4, further comprising:

training at least one neural network to develop the trained language model, the language model having one or more layers and configured to generate at least one of extractive or abstractive textual summaries.

6. The computer-implemented method of claim 4, further comprising:

determining by natural language processing ("NLP") that the at least one conversation span includes one or more of an issue, predicted outcome, or action item.

7. The computer-implemented method of claim 6, wherein the trained language model is probability-based and applies a predetermined threshold score for identifying the at least one of the issue, the predicted outcome, or the action item.

8. The computer-implemented method of claim 4, further comprising:

determining, based at least in part on Softmax regression, the one or more categories.

9. The computer-implemented method of claim 4, further comprising:

determining, by the extractor module, one or more extraneous text strings in the at least one conversation span, the one or more extraneous text strings not associated with an issue, a predicted outcome, or an action item; and removing from the at least one conversation span, by the extractor module, the one or more extraneous text strings.

10. The computer-implemented method of claim 4, wherein the trained language model is deployed into production use at a contact center.

11. The computer-implemented method of claim 4, further comprising:

entering, by a contact center agent computing device, the communication; and providing, to the contact center agent computing device, electronic access to the summary of the communication.

12. A computer-implemented system, comprising:

at least one processor; and memory including instructions that, when executed by the at least one processor, cause the system to:

deploy a trained language model into production use, the language model configured to generate summaries having a configured output format;

obtain a transcript of a communication;

determine, based at least in part on a locator module applying the trained language model to the transcript of the communication, at least one conversation span;

determine, for each topic identified in the at least one conversation span, a category to which the topic belongs, based at least on a topical weighting generated over a period of time from a plurality of calls received from a plurality of callers;

select, by an extractor module applying the trained language model and based at in part on the one or more categories, representative text found in the at least one conversation span;

generate, by a summarizer module applying the trained language model and based at least in part on the representative text, a summary of the communication, the summary having the configured output format;

provide an agent with permission to edit the summary of the communication; and update the trained language model based at least in part on at least one edit made by the agent.

13. The computer-implemented system of claim 12, wherein the trained language model is a Bidirectional Encoder Representations from Transformers ("BERT")-based model.

14. The computer-implemented system of claim 12, wherein the trained language model, by applying at least one predetermined scoring threshold to one or more text strings in the transcript of the communication, identifies at least one of an issue, a predicted outcome, or an action item.

15. The computer-implemented system of claim 12, further comprising:

filtering from the representative text, by the extractor module, at least one text string not associated with an issue, a predicted outcome, or an action item.

16. The computer-implemented system of claim 12, wherein the instructions, when executed, further cause the system to:

train at least one neural network using a data set, the data set including information associated with contact center customer conversations.

17. The computer-implemented system of claim 12, wherein entering the communication consists of receiving an incoming call or other electronic communication or initiating an outgoing call or other electronic communication.

18. The computer-implemented system of claim 12, wherein the communication occurs over at least one of a cellular, PSTN, or cloud network.

* * * * *